US010131188B2

(12) United States Patent
Miyoshi et al.

(10) Patent No.: US 10,131,188 B2
(45) Date of Patent: Nov. 20, 2018

(54) PNEUMATIC TIRE

(71) Applicant: The Yokohama Rubber Co., LTD., Minato-ku, Tokyo (JP)

(72) Inventors: Masaaki Miyoshi, Hiratsuka (JP); Hiraku Kouda, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 3 days.

(21) Appl. No.: 15/031,698

(22) PCT Filed: Mar. 28, 2014

(86) PCT No.: PCT/JP2014/059255
§ 371 (c)(1),
(2) Date: Apr. 22, 2016

(87) PCT Pub. No.: WO2015/059942
PCT Pub. Date: Apr. 30, 2015

(65) Prior Publication Data
US 2016/0243899 A1   Aug. 25, 2016

(30) Foreign Application Priority Data

Oct. 24, 2013   (JP) ................................ 2013-221462

(51) Int. Cl.
*B60C 11/03* (2006.01)
*B60C 11/12* (2006.01)
*B60C 11/00* (2006.01)

(52) U.S. Cl.
CPC ...... *B60C 11/0332* (2013.01); *B60C 11/0302* (2013.01); *B60C 11/0306* (2013.01);
(Continued)

(58) Field of Classification Search
CPC ..... B60C 2011/0332; B60C 2011/0008; B60C 2011/0302; B60C 2011/0306;
(Continued)

(56) References Cited

U.S. PATENT DOCUMENTS 5,147,477 A * 9/1992 Mouri ................... B60C 1/0016
152/209.4
5,213,641 A * 5/1993 Tsuda ...................... B60C 11/11
152/209.28
(Continued)

FOREIGN PATENT DOCUMENTS

JP   S62-0283001   12/1987
JP   04043105 A  *  2/1992
(Continued)

OTHER PUBLICATIONS

JP08-156528 machine translation provided by https://www4.j-platpat.inpit.go.jp/cgi-bin/tran_web_cgi_ejje?u=http://www4.j-platpat.inpit.go.jp/eng/translation/20170821204929086322715274858770446​6C613845B342A9E4BB2D8A8D64AE08 on Aug. 21, 2017.*
(Continued)

*Primary Examiner* — Jodi C Franklin
(74) *Attorney, Agent, or Firm* — Thorpe North & Western (57) ABSTRACT

The pneumatic tire includes lateral communication grooves, and circumferential grooves. In a tread portion shoulder region, the lateral communication groove is disposed between a pair of V-shaped crossing grooves adjacent in a tire circumferential direction and extends from a tread edge portion toward a tire equatorial plane. In a tread portion center region, the lateral communication groove communicates with the V-shaped crossing groove located to a projecting side of the V-shape of the pair of V-shaped crossing grooves and does not communicate with the other V-shaped crossing groove of the pair. The circumferential grooves are disposed in the tread portion shoulder region and extend in the tire circumferential direction, communicating with the V-shaped crossing grooves and the lateral communication grooves.

33 Claims, 6 Drawing Sheets

(52) U.S. Cl.
CPC .......... *B60C 11/12* (2013.01); *B60C 11/1236* (2013.01); *B60C 2011/0016* (2013.01); *B60C 2011/0334* (2013.01); *B60C 2011/0346* (2013.01); *B60C 2011/0353* (2013.01); *B60C 2011/0355* (2013.01); *B60C 2011/0372* (2013.01); *B60C 2011/0374* (2013.01); *B60C 2011/1213* (2013.01)

(58) Field of Classification Search
CPC ......... B60C 2011/12; B60C 2011/1236; B60C 2011/0016; B60C 2011/0334; B60C 2011/0346; B60C 2011/0353; B60C 2011/0355; B60C 2011/0372; B60C 2011/1213; B60C 2011/0374–2011/0379
See application file for complete search history.

(56) References Cited

U.S. PATENT DOCUMENTS

| | | | | |
|---|---|---|---|---|
| 5,435,366 A * | 7/1995 | Voigt | ............ | B60C 11/0302 152/209.18 |
| 5,609,699 A * | 3/1997 | Himuro | ............ | B60C 11/0302 152/209.15 |
| 5,759,313 A * | 6/1998 | Shirai | ............ | B60C 9/2009 152/209.18 |
| D397,066 S * | 8/1998 | Grosskopf | ............ | D12/566 |
| 6,075,098 A * | 6/2000 | Fujino | ............ | B60C 1/0016 152/209.7 |
| D450,293 S * | 11/2001 | Williams | ............ | D12/565 |
| 7,270,163 B2 * | 9/2007 | Colombo | ............ | B60C 11/0302 152/209.18 |
| 7,461,677 B2 * | 12/2008 | Noguchi | ............ | B60C 11/0302 152/209.15 |
| D780,673 S * | 3/2017 | Fujisawa | ............ | D12/564 |
| D786,779 S * | 5/2017 | Scheifele | ............ | D12/533 |
| 2002/0139462 A1 * | 10/2002 | Hanebuth | ............ | B60C 9/2009 152/209.15 |
| 2004/0112494 A1 * | 6/2004 | Colombo | ............ | B60C 11/0302 152/209.18 |
| 2010/0132864 A1 * | 6/2010 | Colombo | ............ | B60C 11/0302 152/209.8 |
| 2011/0041973 A1 * | 2/2011 | Numata | ............ | B60C 11/0306 152/209.18 |
| 2012/0103493 A1 * | 5/2012 | Knispel | ............ | B60C 11/0302 152/209.25 |
| 2012/0273108 A1 * | 11/2012 | Yoshida | ............ | B60C 11/12 152/209.25 |
| 2013/0146192 A1 * | 6/2013 | Miyoshi | ............ | B60C 11/1315 152/209.25 |
| 2014/0116591 A1 * | 5/2014 | Kurashina | ............ | B60C 11/0302 152/209.28 |
| 2014/0158264 A1 * | 6/2014 | Kiwaki | ............ | B60C 11/0309 152/209.18 |
| 2015/0183273 A1 | 7/2015 | Colombo et al. | | |

FOREIGN PATENT DOCUMENTS

| | | | | |
|---|---|---|---|---|
| JP | H04-043105 | 2/1992 | | |
| JP | H04-050006 | 2/1992 | | |
| JP | H05-093909 | 12/1993 | | |
| JP | H07-223409 | 8/1995 | | |
| JP | 08156528 A * | 6/1996 | .......... | B60C 11/033 |
| JP | H08-0156528 | 6/1996 | | |
| JP | 08310205 A * | 11/1996 | .......... | B60C 11/0302 |
| JP | H09-058218 | 3/1997 | | |
| JP | 09220913 A * | 8/1997 | .......... | B60C 11/0302 |
| JP | 10024706 A * | 1/1998 | .......... | B60C 11/0304 |
| JP | H10-0324116 | 12/1998 | | |
| JP | 2000-108615 | 4/2000 | | |
| JP | 2003-182312 | 7/2003 | | |
| JP | 2010-513117 | 4/2010 | | |
| JP | 2011-012111 | 1/2011 | | |
| JP | 2012-096784 | 5/2012 | | |
| JP | 5083451 | 11/2012 | | |
| JP | 2013-057041 | 3/2013 | | |
| JP | 2013-119306 | 6/2013 | | |
| JP | 2013119306 A * | 6/2013 | .......... | B60C 11/0302 |
| WO | WO 2008/074353 | 6/2008 | | |

OTHER PUBLICATIONS

International Search Report for International Application No. PCT/JP2014/059255 dated Jun. 24, 2014, 4 pages, Japan.

* cited by examiner

| | CONVENTIONAL EXAMPLE | WORKING EXAMPLE 1 | WORKING EXAMPLE 2 | WORKING EXAMPLE 3 | WORKING EXAMPLE 4 | WORKING EXAMPLE 5 | WORKING EXAMPLE 6 | WORKING EXAMPLE 7 |
|---|---|---|---|---|---|---|---|---|
| GROOVE WIDTH OF CIRCUMFERENTIAL GROOVES (mm) | CENTER: 10 SHOULDER: 10 | 2 | 5 | 5 | 5 | 5 | 5 | 5 |
| GROOVE DEPTH RATIO OF THE CIRCUMFERENTIAL GROOVES TO THE V-SHAPED CROSSING GROOVES (%) | CENTER: 100 SHOULDER: 100 | 65 | 90 | 65 | 45 | 65 | 65 | 65 |
| ANGLE OF THE INCLINED GROOVE PORTION OF THE CIRCUMFERENTIAL GROOVES (deg) | 0 | 0 | 0 | 0 | 0 | 0 | 0 | 0 |
| g (mm) | 0 | 0 | 0 | 0 | 0 | 1.4 | 1.4 | 1.4 |
| STI | 180 | 198 | 200 | 200 | 200 | 200 | 200 | 200 |
| γ (deg) | 150 | 180 | 180 | 180 | 180 | 180 | 140 (PROPER VALUE) | 140 (PROPER VALUE) |
| BENT PORTION OF THE LATERAL COMMUNICATION GROOVE IN THE CENTER REGION | ABSENT (ENDS WITHOUT BENDING) | PRESENT (BENDS IN A V-SHAPE) | PRESENT (BENDS IN A V-SHAPE) | PRESENT (BENDS IN A V-SHAPE) | PRESENT (BENDS IN A V-SHAPE) | PRESENT (BENDS IN A V-SHAPE) | PRESENT (BENDS IN A V-SHAPE) | ABSENT (CURVES IN AN ARC) |
| BREAKING ON SNOW PERFORMANCE | 100 | 102 | 105 | 105 | 103 | 107 | 109 | 109 |
| WET BRAKING PERFORMANCE | 100 | 105 | 102 | 105 | 105 | 105 | 105 | 105 |
| STEERING STABILITY IN WET CONDITIONS | 100 | 105 | 103 | 105 | 105 | 105 | 105 | 103 |

PNEUMATIC TIRE

TECHNICAL FIELD

The present technology relates to a pneumatic tire, and more particularly relates to a pneumatic tire capable of enhanced breaking on snow performance and wet performance.

BACKGROUND ART

In winter tires of recent years, high wet performance (braking performance and steering stability in wet conditions) as well as suitable breaking on snow performance have been demanded. To meet this demand, tires have been designed with tread patterns having an array of V-shaped crossing grooves formed in the tire circumferential direction. The technologies disclosed in Japanese Unexamined Patent Application Publication Nos. 2010-513117A, H10-324116A, H9-058218A, 2003-182312A, and 2012-096784A are known conventional pneumatic tires that are configured in this manner.

SUMMARY

The present technology provides a pneumatic tire capable of enhanced breaking on snow performance and wet performance.

Provided is a pneumatic tire comprising V-shaped crossing grooves having a V-shape projecting in a tire circumferential direction that cross a tread portion in a tire width direction and open to left and right tread edge portions, the V-shaped crossing grooves being arranged at predetermined intervals in the tire circumferential direction with an orientation of the V-shape aligned;

lateral communication grooves disposed between a pair of the V-shaped crossing grooves adjacent in the tire circumferential direction and extending from one of the tread edge portions toward a tire equatorial plane in a tread portion shoulder region, each of the lateral communication grooves communicating with the V-shaped crossing groove located to a projecting side of the V-shape of the pair of V-shaped crossing grooves and not communicating with the other V-shaped crossing groove of the pair in a tread portion center region; and circumferential grooves disposed in the tread portion shoulder region extending in the tire circumferential direction, the circumferential grooves communicating with the V-shaped crossing grooves and the lateral communication grooves.

With the pneumatic tire according to the present technology, because the lateral communication groove communicates only with the V-shaped crossing groove located to the projecting side of the V-shape of the pair of V-shaped crossing grooves and does not communicate with the other V-shaped crossing groove of the pair, the rigidity of the block formed between the lateral communication groove and the other V-shaped crossing groove is ensured. As a result, the breaking on snow performance and wet performance of the tire is advantageously enhanced greater than a configuration in which the lateral communication groove communicates with both of the V-shaped crossing grooves of the pair.

DETAILED DESCRIPTION

The technology is described in detail below, with reference to the accompanying drawings. However, the technology is not limited to the embodiment. In addition, the components of the embodiment include components that are replaceable while maintaining consistency of the technology, and obviously replaceable components. Furthermore, a plurality of modified examples described in the embodiment may be freely combined within the scope of obviousness to a person skilled in the art.

Pneumatic Tire

Figure 1:
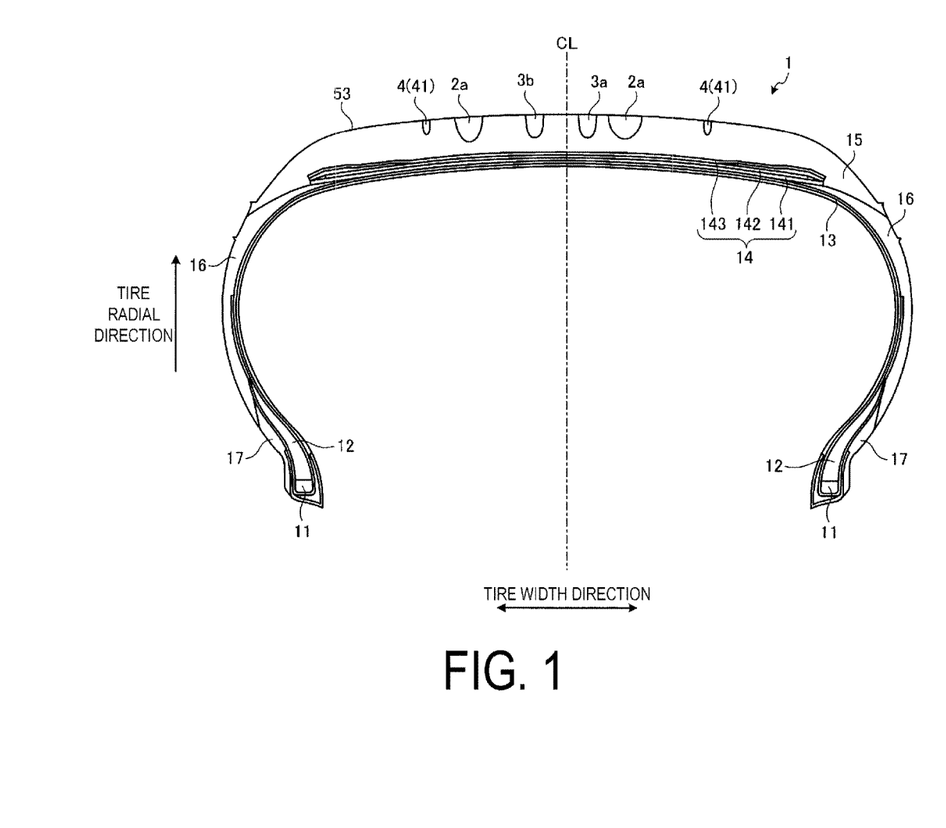
FIG. 1 is a cross-sectional view along a tire meridian direction illustrating a pneumatic tire according to an embodiment of the technology.

FIG. 1 is a cross-sectional view along a tire meridian direction illustrating a pneumatic tire according to the embodiment of the technology. FIG. 1 illustrates the region to one side in the tire radial direction. FIG. 1 illustrates a radial tire for a passenger vehicle as an example of a pneumatic tire. Note that the tire equatorial plane is indicated by the reference sign CL. Herein, "tire width direction" refers the direction parallel to the tire rotational axis (not illustrated); "tire radial direction" refers to the direction perpendicular to the tire rotational axis.

The pneumatic tire 1 has an annular structure centered on the tire rotational axis and includes a pair of bead cores 11, 11, a pair of bead fillers 12, 12, a carcass layer 13, a belt layer 14, a tread rubber 15, a pair of sidewall rubbers 16, 16, and a pair of rim cushion rubbers 17, 17 (see FIG. 1).

The pair of the bead cores 11, 11 have an annular structure and constitute cores of bead sections on the left and right sides. The pair of bead fillers 12, 12 are disposed on peripheries of the pair of bead cores 11, 11 in the tire radial direction so as to reinforce the bead sections.

The carcass layer 13 extends between the left and right side bead cores 11, 11 in a toroidal form, forming a framework of the tire. Additionally, both ends of the carcass layer 13 are folded toward outer sides in the tire width direction so as to wrap around the bead cores 11 and the bead fillers 12, and fixed. The carcass layer 13 is constituted by a plurality of carcass cords formed from steel or organic fibers (e.g. aramid, nylon, polyester, rayon, or the like), covered by a coating rubber, and subjected to a rolling process. The carcass layer 13 has a carcass angle (inclination angle of the fiber direction of the carcass cord with respect to the tire circumferential direction), as an absolute value, of not less than 85 degrees and not more than 95 degrees.

The belt layer 14 is formed by layering a pair of cross belts 141, 142 and a belt cover 143 and is disposed on the periphery of the carcass layer 13. The pair of cross belts 141, 142 are constituted by a plurality of belt cords formed from steel or organic fibers, covered by coating rubber, and subjected to a rolling process. The cross belts 141, 142 have a belt angle, as an absolute value, of not less than 10 degrees and not more than 30 degrees. Furthermore, the pair of cross belts 141, 142 have belt angles (inclination angles of the fiber direction of the belt cords with respect to the tire circumferential direction) of opposite signs, and are layered so that the fiber directions of the belt cords intersect each other (crossply configuration). The belt cover 143 is configured by a plurality of belt cords formed from steel or an organic fiber material, covered by coating rubber, and subjected to a rolling process. The belt cover 143 has a belt angle, as an absolute value, of not less than 10° and not more than 45°. Moreover, the belt cover 143 is disposed in a layered manner to the outer side of the cross belts 141, 142 in the tire radial direction.

The tread rubber 15 is disposed to the outer side in the tire radial direction of the carcass layer 13 and the belt layer 14, and constitutes a tread portion. The pair of sidewall rubbers 16, 16 are disposed to the outer side of the carcass layer 13 in the tire width direction. The sidewall rubbers 16, 16 constitute sidewall portions on the left and right sides. The pair of rim cushion rubbers 17, 17 are disposed to the outer side of the left and right bead cores 11, 11 and the bead fillers 12, 12 in the tire width direction, and constitute left and right bead sections.

Tread Pattern

Figure 2:
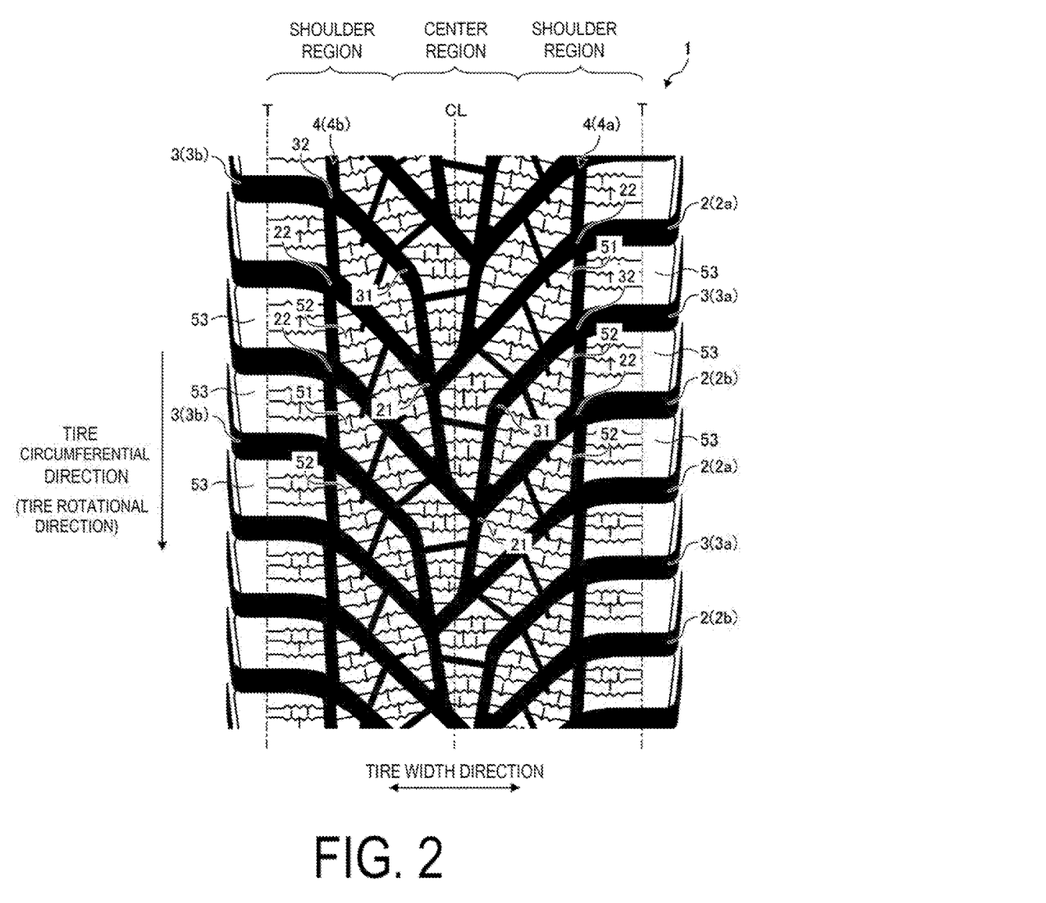
FIG. 2 is a plan view illustrating a tread surface of the pneumatic tire illustrated in FIG. 1.

FIG. 2 is a plan view illustrating a tread surface of the pneumatic tire illustrated in FIG. 1. FIG. 2 illustrates a tread pattern of a winter tire. Note that "tire circumferential direction" refers to the direction revolving about the tire rotational axis.

Especially in winter tires, breaking on snow performance as well as high wet performance (water drainage performance) has been demanded. The pneumatic tire 1 with the configuration described below includes grooves with an arrangement and shape that have been designed with this in mind in order to provide enhanced breaking on snow performance and wet performance.

The region defined by the left and right tire ground contact edge T is divided into three regions in the tire width direction. The center region is referred to as "tread portion center region", and the left and right regions are referred to as "tread portion shoulder region".

The "tire ground contact edge T" refers to the maximum width position in a tire axial direction of a contact surface between the tire and a flat plate in a configuration in which the tire is assembled on a specified rim, inflated to a specified internal pressure, placed perpendicular to the flat plate in a static state, and loaded with a load corresponding to a specified load.

Herein, "specified rim" refers to a "standard rim" defined by the Japan Automobile Tyre Manufacturers Association Inc. (JATMA), a "design rim" defined by the Tire and Rim Association, Inc. (TRA), or a "measuring rim" defined by the European Tyre and Rim Technical Organisation (ETRTO). In addition, the "specified internal pressure" refers to "maximum air pressure" as defined by JATMA, to a maximum value in "Tire Load Limits at various Cold Inflation Pressures" as defined by TRA, and to "Inflation Pressures" as defined by ETRTO. Also, the "specified load" refers to a "maximum load capacity" defined by JATMA, to a maximum value in "Tire Load Limits at various Cold Inflation Pressures" as defined by TRA, and to a "Load Capacity" as defined by ETRTO. However, according to JATMA, for a passenger vehicle tire, the specified internal pressure is an air pressure of 180 kPa, and a specified load is 88% of maximum load capacity.

The pneumatic tire 1 is provided with a plurality of V-shaped crossing grooves 2, a plurality of lateral communication grooves 3, and a left-right pair of circumferential grooves 4 (see FIG. 2).

The V-shaped crossing grooves 2 and the lateral communication grooves 3 are main grooves that are required to have a wear indicator as stipulated by JATMA. Specifically, grooves with such a requirement refers to: (1) among grooves with a groove width of not less than 3.0 mm, grooves with the maximum groove depth; (2) among grooves with a groove width of not less than 3.0 mm, grooves with a groove depth greater than the value of the depth of the groove of (1) subtracted by 1.7 mm; and (3) among grooves with a groove width greater than that of the grooves of (1) or the grooves of (2), grooves with a groove depth greater than the value of the depth of the groove of (1) subtracted by 4.0 mm.

The groove width is measured by taking the maximum groove width within the tread footprint when viewed in a cross section perpendicular to the groove center line. The groove width is measured disregarding any chamfered portions or notched portions at the groove opening portion.

The groove depth is measured by taking the maximum distance from the tread profile to the groove bottom. The groove depth is measured disregarding any raised bottom portions formed in the groove bottom.

The V-shaped crossing grooves 2 are main grooves having a V-shape projecting in the tire circumferential direction. The V-shaped crossing grooves 2 cross the tread portion in the tire width direction and open to both left and right tread edge portions. Specifically, each of the V-shaped crossing grooves 2 extends from the left and right opening portions at the tread edge portions and project in one direction in the tire circumferential direction, forming a single peak portion 21. As a result of this configuration, each of the V-shaped crossing grooves 2 recedes from the tire equatorial plane CL while extending from the V-shaped peak portion 21 in the tire circumferential direction and extends to the left and right tread edge portions in the tire width direction. In addition, the plurality of V-shaped crossing grooves 2 are arranged at predetermined intervals in the tire circumferential direction with the orientation of the V-shape aligned.

"Tread edge portion" refers to the left and right tread edge portions of the tread-patterned portion of the tire when the tire is assembled on a specified rim and inflated to a specified internal pressure and is in an unloaded state.

The lateral communication grooves 3 (for example, the lateral communication grooves 3 illustrated in FIG. 2) are disposed in the tread portion shoulder region between a pair of V-shaped crossing grooves 2a, 2b adjacent in the tire circumferential direction. The lateral communication grooves 3 extend from one of the tread edge portions toward the tire equatorial plane CL. In addition, in the tread portion center region, the lateral communication groove 3a (3b) communicates with the V-shaped crossing groove 2b (2a) located to the projecting side of the V-shape of the pair of V-shaped crossing grooves 2a, 2b and does not communicate with the other V-shaped crossing groove 2a (2b) of the pair. Specifically, the lateral communication grooves 3a (3b) are disposed in the tread portion center region, separated from the V-shaped crossing groove 2a (2b) of the pair of V-shaped crossing grooves 2a, 2b, of which the peak side of the V-shape faces the lateral communication groove 3a (3b).

Note that in the tread portion center region, the lateral communication groove 3a (3b) does not communicate with the V-shaped crossing groove 2a (2b) because of a long block 51 described below formed between the lateral communication groove 3a (3b) and the V-shaped crossing groove 2a (2b).

The circumferential grooves 4 (for example, the circumferential groove 4a illustrated in FIG. 2) are disposed in the tread portion shoulder region and extend in the tire circumferential direction, communicating with the V-shaped crossing grooves 2 (2a, 2b) and the lateral communication grooves 3 (3a).

The groove width of the circumferential grooves 4 is preferably not less than 3 mm. In addition, the groove depth of the circumferential grooves 4 is preferably in the range of not less than 50% and not more than 80% of the groove depth of the V-shaped crossing grooves 2, and more preferably in the range of not less than 60% and not more than 70%.

As an example, the configuration illustrated in FIG. 2 includes a tread pattern in which the V-shaped crossing grooves 2, the lateral communication grooves 3, and the circumferential grooves 4 are disposed as described below.

First, two types of V-shaped crossing grooves 2a, 2b which have a symmetrical configuration are arranged alternating in the tire circumferential direction at predetermined intervals with the orientation of the V-shape aligned. In addition, the lateral communication groove 3a (3b) is disposed between a pair of adjacent V-shaped crossing grooves 2a, 2b. The lateral communication groove 3a disposed in the region to one side of the tire equatorial plane CL and the lateral communication groove 3b disposed in the other region are arranged alternating in the tire circumferential direction. As a result, describing just the region to one side of the tire equatorial plane CL, a unit containing the pair of V-shaped crossing grooves 2a, 2b, and one lateral communication groove 3a (3b) is repeatedly arranged in the tire circumferential direction. In addition, the lateral communication grooves 3a, 3b are arranged in the regions to the left and right of the tire equatorial plane CL in a staggered manner with respect to the tire circumferential direction. The left-right pair of circumferential grooves 4a, 4b are disposed in the respective left and right shoulder regions. As a result, a tread pattern is formed with left-right asymmetric directionality.

In addition, the V-shaped crossing grooves 2 each include the V-shaped peak portion 21 in the tread portion center region and extend asymmetrically from the peak portion 21 and open to the left and right tread edge portions. The bend angle of the peak portion 21 of each of the V-shaped crossing grooves 2 is in the range of not less than 90 degrees to not more than 150 degrees. The pair of adjacent V-shaped crossing grooves 2a, 2b with the lateral communication groove 3a (3b) disposed therebetween has the same groove width and groove depth, and has a symmetrical configuration about the tire equatorial plane CL.

In addition, the V-shaped peak portion 21 of each of the V-shaped crossing grooves 2 is disposed in the center region. The V-shaped peak portion 21 of each of the V-shaped crossing grooves 2 is disposed a predetermined interval distanced from the tire equatorial plane CL. Specifically, the peak portion 21 of each of the V-shaped crossing grooves 2 is located receded from the tire equatorial plane CL. In addition, the peak portions 21, 21 of the V-shaped crossing grooves 2a, 2b adjacent in the tire circumferential direction are arranged alternating to the left and right in the tire circumferential direction. As a result, the tire water drainage performance of the tire when the vehicle is turning is enhanced.

In addition, the V-shaped crossing grooves 2 each has a shape of which the angle of inclination (from 0 degrees to 90 degrees) with respect to the tire circumferential direction increases as the groove extends from the V-shaped peak portion 21 toward the tread edge portions. As a result, each of the V-shaped crossing grooves 2 recedes from the tire equatorial plane CL while extending from the V-shaped peak portion 21 in the tire circumferential direction and extends in the tire width direction toward the left and right tread edge portions.

In addition, the angle of inclination of the V-shaped crossing grooves 2a, 2b in the shoulder regions with respect to the tire width direction is preferably in the range of not less than −10 degrees and not more than +20 degrees when the projecting side of the V-shape is considered positive. Specifically, the V-shaped crossing grooves 2 are preferably substantially parallel to the tire width direction in the shoulder regions. In addition, in the case of the V-shaped crossing grooves 2 having an angle of inclination of not less than −10 degrees (not illustrated), the portion of the V-shaped crossing grooves 2 located in the shoulder regions is inclined toward the projecting side of the V-shape while extending toward the outer side in the tire width direction.

In addition, the V-shaped crossing grooves 2 include bent portions 22 located at the circumferential grooves 4. The bent portions 22 bend toward the projecting side of the V-shape while extending toward the tire equatorial plane CL. Specifically, the V-shaped crossing grooves 2 include the bent portions 22 at the portions that communicate with the circumferential grooves 4. In addition, the bent portions 22 are located in the tread portion shoulder regions. As a result of this configuration, edge components of the blocks approximate to the bent portions 22 are increased, so the performance on snow of the tire is enhanced. In addition, the bent portions 22 are disposed in a staggered manner in the left and right shoulder regions of the tire. As a result, the plurality of bent portions 22 are distributed in the tire circumferential direction, so the breaking on snow performance is enhanced.

Figure 3:
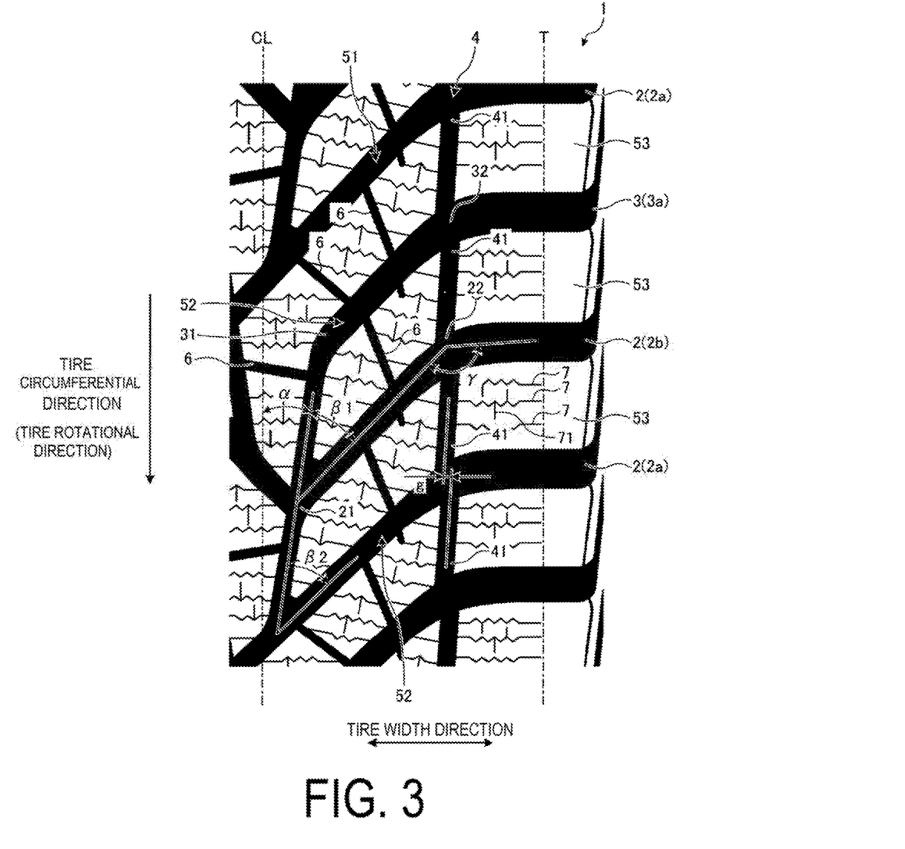
FIG. 3 is an enlarged view illustrating the tread surface of the pneumatic tire illustrated in FIG. 2.

In addition, the bend angle γ of the bent portions 22 of the V-shaped crossing grooves 2 at the communicating portion with the respective circumferential grooves 4 is preferably in the range of 120 degrees≤γ≤160 degrees (see FIG. 3). As a result, the breaking on snow performance of the tire is effectively enhanced. Note that the bend angle γ is measured in reference to the groove center line of the V-shaped crossing groove 2 at the communicating portion with the circumferential groove 4.

In addition, adjacent V-shaped crossing grooves 2, 2 are disposed overlapping in the tire circumferential direction. Specifically, the V-shaped projecting portion of one V-shaped crossing groove 2 is disposed relative to the V-shaped recessed portion of another V-shaped crossing groove 2 with minimal interval therebetween. Consequently, the adjacent V-shaped crossing grooves 2, 2 are disposed overlapping in the tire circumferential direction. As a result of this configuration, the density at which the V-shaped crossing grooves 2 are disposed in the tire circumferential direction is increased.

In addition, each of the lateral communication grooves 3 communicates with two of the V-shaped crossing grooves 2, 2. In such a manner, lateral communication grooves 3 preferably communicate with at least two of the V-shaped crossing grooves 2. In the configuration illustrated in FIG. 2 for example, as described above, the lateral communication groove 3a (3b) is disposed between the pair of V-shaped crossing grooves 2a, 2b (2b, 2a) adjacent in the tire circumferential direction. In addition, in the region to one side of the tire equatorial plane CL, a unit containing the pair of V-shaped crossing grooves 2a, 2b, and one lateral communication groove 3a (3b) is repeatedly arranged in the tire circumferential direction. In addition, in the tread portion shoulder region, the lateral communication groove 3a (3b)

extends from the tread edge portion toward the tire equatorial plane CL parallel to the pair of V-shaped crossing grooves 2a, 2b. In the tread portion center region, the lateral communication groove 3a (3b) bends toward the projecting side of the V-shape of the V-shaped crossing grooves 2 and extends in the tire circumferential direction. Moreover, the lateral communication groove 3a (3b) passes through in the tire circumferential direction the V-shaped crossing groove 2b located to the projecting side of the V-shape of the pair of V-shaped crossing grooves 2a, 2b that sandwich the lateral communication groove 3a (3b). Also, the lateral communication groove 3a (3b) extends to the adjacent unit and communicates with the V-shaped crossing groove 2a of the adjacent unit. As a result, the lateral communication groove 3a connects to two of the V-shaped crossing grooves 2b, 2a and opens to the tread edge portion. Consequently, a water drainage passage from the V-shaped crossing grooves 2b, 2a to the tread edge portion is ensured, so water drainage performance of the tire is enhanced.

Note that it is sufficient that the each of the lateral communication grooves 3 communicate with at least one of the V-shaped crossing grooves 2. In addition, the lateral communication grooves 3 may close at one of the V-shaped crossing grooves 2 as illustrated in FIG. 2 or may close within the block (not illustrated).

In addition, the lateral communication grooves 3 open to the tread edge portion at one end and close in the tread portion at the other end. As a result, the edge components of the tread portion are increased, so the breaking on snow performance of the tire is enhanced.

In addition, the lateral communication grooves 3 each include a bent portion 32 located at the corresponding circumferential groove 4. The bent portion 32 bends toward the projecting side of the V-shape while extending toward the tire equatorial plane CL. Specifically, the lateral communication grooves 3 each include a bent portion 32 at the portion that communicates with the corresponding circumferential groove 4. In addition, the bent portion 32 is located in the tread portion shoulder region. As a result of this configuration, edge components of the blocks approximate to the bent portions 32 are increased, so the performance on snow of the tire is enhanced. In addition, the bent portions 32 are disposed in a staggered manner in the left and right shoulder regions of the tire. As a result, the plurality of bent portions 32 are distributed in the tire circumferential direction, so the breaking on snow performance is enhanced.

FIG. 3 is an enlarged view illustrating the tread surface of the pneumatic tire illustrated in FIG. 2. FIG. 3 illustrates the region to one side of the tire equatorial plane CL.

The configuration illustrated in FIG. 3 includes the lateral communication groove 3 having two bent portions 31, 32. In addition, the lateral communication groove 3 bends at the bent portions 31, 32, thereby changing the angle of inclination (from 0 degrees to 90 degrees) with respect to the tire circumferential direction. As a result, the angle of inclination of the lateral communication groove 3 with respect to the tire circumferential direction increases incrementally as the lateral communication groove 3 extends from the tire equatorial plane CL side toward the tread edge portion.

In this case, in the left and right shoulder regions, the angle of inclination of the lateral communication grooves 3 with respect to the tire axial direction is preferably in the range of not less than −10 degrees to not more than +20 degrees when the projecting side of the V-shape of the V-shaped crossing grooves 2 is considered positive. Specifically, the lateral communication grooves 3 are preferably substantially parallel to the tire width direction in the shoulder regions.

In addition, the angle of inclination α with respect to the tire equatorial plane CL of the lateral communication groove 3 at the portion closest to the tire equatorial plane CL is preferably in the range of 0 degrees≤α≤30 degrees. Specifically, the lateral communication groove 3 preferably extends in the tire circumferential direction in proximity to the tire equatorial plane CL. In addition, the angle of inclination α of the lateral communication groove 3 may be set so that some portions of the lateral communication groove 3 are parallel (α=0 degrees) with the tire equatorial plane CL. Note that the angle of inclination α is measured by determining the angle formed by the tire equatorial plane CL and the groove center line of the lateral communication groove 3.

In the configuration illustrated in FIG. 3 for example, the lateral communication groove 3 communicates with two of the V-shaped crossing grooves 2, 2 in proximity to the tire equatorial plane CL. In addition, the angle of inclination α of the lateral communication groove 3 is the smallest at the portion closest to the tire equatorial plane CL, and as the lateral communication groove 3 extends from the tire equatorial plane CL toward the tread edge portion, the angle of inclination α increases incrementally at the two bent portions 31, 32. The angle of inclination α is at its largest at the tread portion shoulder region. As a result, the water drainage performance at the tread portion center region is enhanced and wet performance is also enhanced.

In addition, crossing angles β1, β2 between the lateral communication groove 3 and two of the V-shaped crossing grooves 2, 2 are in the range of 20 degrees≤β1≤60 degrees and 20 degrees≤β2≤60 degrees, respectively. As a result, edge components of the blocks in the center region are increased. Note that the crossing angles β1, β2 are measured by determining the angle formed by the groove center lines of the lateral communication groove 3 and the V-shaped crossing groove 2 where they communicate.

As illustrated in the enlarged view of FIG. 3, in the configuration illustrated in FIG. 2, the circumferential groove 4 is constituted by a plurality of inclined groove portions 41 connected in the tire circumferential direction.

The inclined groove portions 41 are inclined with respect to the tire equatorial plane CL in the range of ±15 degrees. In addition, the inclined groove portions 41 are disposed in the tread portion shoulder region and connect V-shaped crossing grooves 2, 2 adjacent in the tire circumferential direction or connect V-shaped crossing grooves 2 and lateral communication grooves 3 adjacent in the tire circumferential direction. The opening portions of the inclined groove portions 41 adjacent in the tire circumferential direction are disposed in matching positions so that one continuous circumferential groove 4 is formed in the tire circumferential direction.

As described above, the inclined groove portions 41 are inclined with respect to the tire circumferential direction. Consequently, the opening portions of inclined groove portions 41, 41 adjacent in the tire circumferential direction are disposed in a slightly offset manner. Thus, the circumferential grooves 4 has a zigzag shape that bends slightly at the communicating portion of the V-shaped crossing groove 2 and the lateral communication groove 3. As a result, the edge components are increased, so the wet performance of the tire is enhanced.

In this case, the amount g by which the opening portions of adjacent inclined groove portions 41, 41 are offset is preferably in the range of 1 mm≤g≤3 mm. The offset amount g is measured in reference to the groove center lines of adjacent inclined groove portions 41, 41.

As illustrated in the enlarged view of FIG. 3, in the configuration illustrated in FIG. 2, the pneumatic tire 1 is provided with a plurality of inclined auxiliary grooves 6. By providing these inclined auxiliary grooves 6, the edge components are increased, so the wet performance of the tire is enhanced.

The inclined auxiliary grooves 6 are auxiliary grooves that are inclined and have an angle of inclination with respect to the tire equatorial plane CL of not less than 10 degrees to not more than 90 degrees. In addition, the inclined auxiliary grooves 6 have a groove width of not more than 3.0 mm and a groove depth of not more than 5.0 mm. Consequently, the inclined auxiliary grooves 6 do not in practice divide the blocks 51 to 53 defined by the V-shaped crossing grooves 2, the lateral communication grooves 3, and the circumferential grooves 4. The inclined auxiliary grooves 6 are also not required to have a wear indicator as stipulated by JATMA.

In addition, the inclined auxiliary grooves 6 are each disposed so as to open to at least one of: the V-shaped crossing groove 2 and the lateral communication groove 3. In the configuration illustrated in FIG. 2, the inclined auxiliary grooves 6 connect adjacent V-shaped crossing grooves 2, 2 or connect adjacent V-shaped crossing grooves 2 and lateral communication grooves 3. However, the embodiment is not limited to this configuration, and the inclined auxiliary grooves 6 may close within the blocks 51 to 53 at one end (not illustrated).

As illustrated in FIG. 3, in a configuration in which a plurality of inclined auxiliary grooves 6 are provided in one block 51, the angle of inclination of the inclined auxiliary grooves 6 with respect to the tire equatorial plane CL is preferably larger (becoming substantially parallel with the tire rotational axis) the closer the inclined auxiliary grooves 6 are located to the tire equatorial plane CL. As a result, the edge components formed by the inclined auxiliary grooves 6 are further made appropriate.

As illustrated in the enlarged view of FIG. 3, in the configuration illustrated in FIG. 2, the pneumatic tire 1 is provided with a plurality of sipes 7. By providing these sipes 7, the breaking on snow performance is enhanced.

Note that in the configuration of FIG. 3, the sipes 7 have a zigzag shape in plan view of the tread and are provided with a branch portion 71 at a bend point of the zigzag shape. In addition, the branch portion 71 extends to one side from a bend point of the zigzag shape in a direction perpendicular to the extension direction of the sipe 7 and closes within the corresponding block 51, 52, or 53 without communicating with another sipe. By providing such sipes, the breaking on snow performance is effectively enhanced.

Figure 4:
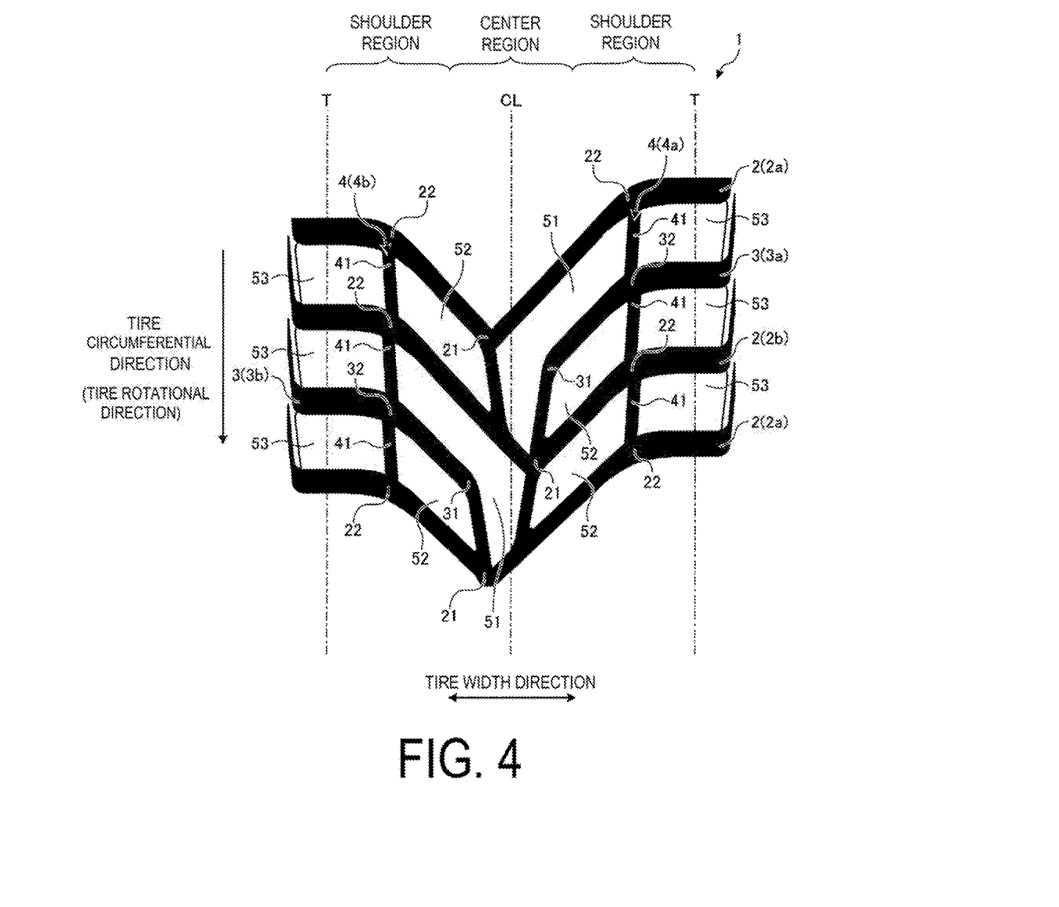
FIG. 4 is an explanatory view illustrating a tread pattern of the pneumatic tire illustrated in FIG. 2.

FIG. 4 is an explanatory view illustrating the tread pattern of the pneumatic tire illustrated in FIG. 2. FIG. 4 illustrates the unit pattern of the block column composing the tread pattern. The tread pattern illustrated in FIG. 2 is constituted by the block column illustrated in FIG. 4 disposed repeatedly in the tire circumferential direction. Note that in FIG. 4, the inclined auxiliary grooves 6 and the sipes 7 are omitted for the sake of clearly viewing the planar form of the blocks 51 to 53.

As illustrated in FIG. 4, in the configuration illustrated in FIG. 2, the pneumatic tire 1 has a block pattern formed by an array of three types of blocks 51 to 53.

The first block 51 is a long block extending continuously from the corresponding circumferential groove 4 to at least the tire equatorial plane CL.

As described above, in the configuration illustrated in FIG. 4, in the region to one side of the tire equatorial plane CL, the lateral communication groove 3a (3b) is disposed between the pair of adjacent V-shaped crossing grooves 2a, 2b (2b, 2a). The lateral communication groove 3 includes the bent portion 31 in the tread portion center region and bends toward the projecting side of the V-shape of the V-shaped crossing grooves 2 while extending toward the tire equatorial plane CL. In addition, the lateral communication groove 3a (3b) communicates with one V-shaped crossing groove 2b (2a) of the pair and does not communicate with the other V-shaped crossing groove 2a (2b) of the pair. As a result, the one long block 51 is defined by the side on the peak side of the V-shape of the other V-shaped crossing groove 2a (2b) of the pair, the side on the back side of the bent shape of the lateral communication groove 3a (3b), and the side on the inner side in the width direction of the circumferential groove 4a (4b). In addition, the long block 51 extends continuously in the tire width direction from the circumferential groove 4a (4b) to a position beyond the tire equatorial plane CL. A plurality of the long blocks 51 alternately extend from the regions to the left and right of the tire equatorial plane CL toward the tire equatorial plane CL. As a result, at the tire equatorial plane CL, one block column constituted by a plurality of the long blocks 51 is formed.

Note that the long block 51 is consider to be continuous as long as it is not divided by a groove (main groove) that is required to have a wear indicator as stipulated by JATMA. Consequently, the long block 51 may include the above-described inclined auxiliary grooves 6, sipes 7, kerfs (not illustrated), and the like.

The second block 52 is a short block extending continuously from the circumferential groove 4 almost to the tire equatorial plane CL.

In the configuration illustrated in FIG. 4, in the region to one side of the tire equatorial plane CL, one of the short blocks 52 is defined by the side on the front side of the bent shape of the lateral communication groove 3a (3b), the side on the valley side of the V-shape of the V-shaped crossing groove 2b (2a), and the side on the inner side in the tire width direction of the circumferential groove 4a (4b). Another one of the short blocks 52 is defined by the pair of adjacent V-shaped crossing grooves 2b, 2a (2a, 2b), the lateral communication groove 3a (3b), and the circumferential groove 4a (4b). The lateral communication groove 3a (3b) includes the bent portion 31 in the tread portion center region and extends in the tire circumferential direction without intersecting the tire equatorial plane CL. As a result, the short block 52 does not intersect the tire equatorial plane CL and is disposed distanced from the tire equatorial plane CL.

The third block 53 is a shoulder block located to the outer side of the circumferential grooves 4 in the tire width direction.

In the configuration illustrated in FIG. 4, a plurality of shoulder blocks 53 are defined by the plurality of V-shaped crossing grooves 2, the lateral communication grooves 3, and the side on the outer side in the tire width direction of the circumferential grooves 4. As a result, one block column constituted by a plurality of the shoulder blocks 53 is formed at the corresponding left and right tire ground contact edge T, T.

In the configuration illustrated in FIG. 4, the number of long blocks 51 disposed at the tire equatorial plane CL is less than the number of shoulder blocks 53 disposed at the tire ground contact edge T. Specifically, the ratio of the number of long block 51 disposed at the tire equatorial plane CL to the number of shoulder blocks 53 disposed at the tire ground contact edge T is 2:3.

Note that the snow traction index STI of the pneumatic tire 1 with respect to the tire width direction (90 degrees snow traction index) throughout the entire circumference of the tire is in the range of 160≤STI≤240.

The snow traction index STI is an empirical formula by Uniroyal Inc. proposed by the Society of Automotive Engineers (SAE) and is defined by the following formula (1). In the formula, Pg is a groove density (1/mm) and is calculated as a ratio between the groove length of all the grooves (all grooves except sipes) projected in the tire width direction on the tire ground contact patch and the tire ground contact patch area (product of the tire ground contact width and tire circumferential length). In addition, ρs is a sipe density (1/mm) and is calculated as a ratio between the sipe length of all the sipes projected in the tire width direction on the tire ground contact patch and the tire ground contact patch area. Furthermore, Dg is an average value of the groove depth of all the grooves projected in the tire width direction on the tire ground contact patch.

$$STI=-6.8+2202\times Pg+672\times \rho s+7.6\times Dg \qquad (1)$$

In addition, the tread rubber 15 of the pneumatic tire 1 is constituted by a cap tread rubber and an under tread rubber (not illustrated). The cap tread rubber has a Japanese Industrial Standard JIS-A hardness at 20° C. in the range of not less than 50 and not more than 70. Herein, the term rubber hardness refers to JIS-A hardness in accordance with JIS-K6253.

Rotational Direction Designation

The rotational direction of the pneumatic tire 1 (see FIG. 2) is designated as the direction of the projecting side of the V-shape of the V-shaped crossing grooves 2. "Tire rotational direction" refers to the rotational direction frequently used when the tire is in use, for example the rotational direction when the vehicle travels forward. An indicator of the rotational direction of the tire is displayed by marks or a ridged and grooved portion provided on the sidewall portion of the tire, for example.

Effect

As described above, the pneumatic tire 1 is provided with V-shaped crossing grooves 2 that have a V-shape projecting in the tire circumferential direction. The V-shaped crossing grooves 2 also cross the tread portion in the tire width direction and open to both left and right tread edge portions (see FIG. 2). In addition, the plurality of V-shaped crossing grooves 2 are arranged at predetermined intervals in the tire circumferential direction with the orientation of the V-shape aligned. The pneumatic tire 1 is also provided with lateral communication grooves 3 and circumferential grooves 4. In the tread portion shoulder region, the lateral communication groove 3a (3b) is disposed between the pair of V-shaped crossing grooves 2a, 2b (2b, 2a) adjacent in the tire circumferential direction and extends from the tread edge portion toward the tire equatorial plane CL. In the tread portion center region, the lateral communication groove 3a (3b) communicates with the V-shaped crossing groove 2b (2a) located to the projecting side of the V-shape of the pair of V-shaped crossing grooves 2a, 2b (2b, 2a) and does not communicate with the other V-shaped crossing groove 2a (2b) of the pair. The circumferential grooves 4 are disposed in the tread portion shoulder region and extend in the tire circumferential direction, communicating with the V-shaped crossing grooves 2 and the lateral communication grooves 3.

With such a configuration, (1) because a plurality of V-shaped crossing grooves 2 are disposed, the V-shaped crossing grooves 2 become water drainage passages when the pneumatic tire 1 is mounted on a vehicle with the V-shaped peak portion 21 of the V-shaped crossing grooves 2 facing the tire rotational direction (see FIG. 2). As a result, wet performance (wet braking performance and wet steering stability performance) is advantageously enhanced;

(2) because the lateral communication groove 3a (3b) communicates with the V-shaped crossing groove 2b (2a) of the pair and extends from the tread portion center region to the shoulder region, water drainage passages are formed from the V-shaped crossing groove 2b (2a) to the lateral communication groove 3a (3b). As a result, the wet performance of the tire is advantageously enhanced;

(3) because of the V-shaped crossing grooves 2 and the lateral communication grooves 3, the edge components of the tread portion are increased. As a result, the breaking on snow performance of the tire is advantageously enhanced; and (4) because the lateral communication groove 3a (3b) communicates only with the V-shaped crossing groove 2b (2a) located to the projecting side of the V-shape of the pair of V-shaped crossing grooves 2a, 2b (2b, 2a) and does not communicate with the other V-shaped crossing groove 2a (2b) of the pair, the rigidity of the long block 51 formed between the lateral communication groove 3a (3b) and the other V-shaped crossing groove 2a (2b) is ensured. With such a configuration, the wet performance of the tire is advantageously enhanced greater than a configuration in which the lateral communication groove communicates with both of the V-shaped crossing grooves of the pair (not illustrated).

In addition, the pneumatic tire 1 is provided with long blocks 51 defined by the V-shaped crossing groove 2a (2b), the lateral communication groove 3a (3b), and the circumferential groove 4a (4b). The long blocks 51 extend continuously from the circumferential groove 4a (4b) to a position beyond the tire equatorial plane CL (see FIG. 2). With such a configuration, because long blocks 51 are continuous from the circumferential groove 4a (4b) to the tire equatorial plane CL, block rigidity can be ensured. As a result, the dry performance of the tire is advantageously enhanced.

In addition, the pneumatic tire 1 is not provided with any circumferential main grooves (circumferential grooves that are required to have a wear indicator as stipulated by JATMA) extending continuously in the tire circumferential direction in the region to the inner side of the circumferential grooves 4 in the tire width direction (see FIG. 2). Such a configuration is effective against hydroplaning. As a result, the wet performance of the tire is advantageously enhanced greater than a configuration in which circumferential main grooves are disposed in the region to the inner side of the circumferential grooves in the tire width direction (for example, Conventional Example illustrated in FIG. 6 described below).

In addition, in the pneumatic tire 1, the number of long blocks 51 disposed at the tire equatorial plane CL is less than the number of shoulder blocks 53 disposed at the tire ground contact edge T (see FIG. 2). With such a configuration, block rigidity is ensured. As a result, dry performance of the tire is advantageously enhanced.

In addition, in the pneumatic tire 1, the V-shaped crossing grooves 2 include the bent portions 22 located at the circumferential grooves 4. The bent portions 22 bend toward the projecting side of the V-shape of the V-shaped crossing grooves 2 while extending toward the tire equatorial plane CL (see FIG. 2). With such a configuration, the edge components of the blocks 51 to 53 defined by the bent portions 22 of the V-shaped crossing grooves 2 are ensured. As a result, the breaking on snow performance of the tire is advantageously enhanced.

In addition, in the pneumatic tire 1, each of the lateral communication grooves 3 includes the bent portion 31 in the tread portion center region. The bent portion 31 bends toward the projecting side of the V-shape of the V-shaped crossing grooves 2 while extending toward the tire equatorial plane CL (see FIG. 2). With such a configuration, because each of the lateral communication grooves 3 includes the bent portion 31, the angle of inclination of the lateral communication groove 3 before and after the bent portion 31 varies. As a result, the water drainage properties of the lateral communication grooves 3 are enhanced and the wet performance of the tire is advantageously enhanced.

In addition, in the pneumatic tire 1, each of the lateral communication grooves 3 includes the bent portion 32 located at the circumferential groove 4. The bent portion 32 bends toward the projecting side of the V-shape of the V-shaped crossing grooves 2 while extending toward the tire equatorial plane CL (see FIG. 2). With such a configuration, the edge components of the blocks 51 to 53 defined by the bent portion 32 of the lateral communication groove 3 are ensured. As a result, the breaking on snow performance of the tire is advantageously enhanced.

The pneumatic tire 1 has a configuration in which the groove width of the circumferential grooves 4 is not less than 3 mm. As a result, the groove width of the circumferential grooves 4 is ensured and the wet performance of the tire is advantageously enhanced.

In addition, the pneumatic tire 1 has a configuration in which the groove depth of the circumferential grooves 4 is in the range of not less than 50% and not more than 80% of the groove depth of the V-shaped crossing grooves 2. As a result, the rigidity of the blocks 51 to 53 is ensured and the wet performance of the tire is advantageously enhanced. Specifically, because the groove depth of the circumferential grooves 4 is not less than 50%, the breaking on snow performance of the tire is ensured; and because the groove depth of the circumferential grooves 4 is not more than 80%, the wet performance of the tire is enhanced.

In addition, the pneumatic tire 1 has a configuration in which the circumferential grooves 4 are formed by the plurality of inclined groove portions 41 connected in the tire circumferential direction, and the inclined groove portions 41 have an angle of inclination with respect to the tire equatorial plane CL in the range of ±15 degrees. As a result, the angle of inclination of the inclined groove portions 41 is made appropriate and the braking performance on snow is advantageously enhanced.

The pneumatic tire 1 is provided with a tread pattern that is formed by a repeating circumferential array, the array including: the first V-shaped crossing groove 2a, the first lateral communication groove 3a disposed to the projecting side of the V-shape of the first V-shaped crossing groove 2a in the region to one side of the tire equatorial plane CL (the region to the right side in FIG. 2 for example), the second V-shaped crossing groove 2b disposed sandwiching the first lateral communication groove 3a with the first V-shaped crossing groove 2a, and the second lateral communication groove 3b disposed to the projecting side of the V-shape of the second V-shaped crossing groove 2b in the region to the other side of the tire equatorial plane CL (the region to the left side in FIG. 2 for example) (see FIG. 2). As a result, the disposed configuration of the V-shaped crossing grooves 2a, 2b and the lateral communication grooves 3a, 3b is made appropriate, and the wet performance and the breaking on snow performance of the tire is advantageously enhanced.

In addition, the pneumatic tire 1 is provided with the first long block 51 (the block in the region to the right side in FIG. 2) that is defined by the first V-shaped crossing groove 2a and the first lateral communication groove 3a and disposed in the region to one side of the tire equatorial plane CL (the region to the right side in FIG. 2 for example), the first long block 51 extending continuously from the tread portion shoulder region (the circumferential groove 4a in FIG. 2) to a position beyond the tire equatorial plane CL; and the second long block 51 (the block in the region to the left side in FIG. 2) that is defined by the second V-shaped crossing groove 2b and the second lateral communication groove 3b and disposed in the region to the other side of the tire equatorial plane CL (the region to the left side in FIG. 2 for example), the second long block 51 extending continuously from the tread portion shoulder region (the circumferential groove 4b in FIG. 2) to a position beyond the tire equatorial plane CL. The first long block 51 and the second long block 51 are arranged alternating in the tire circumferential direction at the tire equatorial plane CL (see FIGS. 2 and 4). As a result, the long block 51 array is made appropriate and the wet performance and the breaking on snow performance of the tire is advantageously enhanced.

In addition, the snow traction index STI of the pneumatic tire 1 with respect to the tire width direction throughout the entire circumference of the tire is in the range of $160 \leq STI \leq 240$. As a result, the snow traction index STI is appropriately adjusted, which is advantageous. Specifically, by $160 \leq STI$ being satisfied, the breaking on snow performance of the tire is ensured. By $STI \leq 240$ being satisfied, the wet performance of the tire is ensured.

In addition, the cap tread rubber of the pneumatic tire 1 has a JIS-A hardness at 20° C. in the range of not less than 50 and not more than 70. As a result, the hardness of the cap tread is made appropriate, which is advantageous. Specifically, when the hardness of the cap tread is not less than 50, block rigidity is ensured, and breaking on snow performance of the tire is ensured. In addition, when the hardness of the cap tread is not greater than 70, the wet performance of the tire is ensured.

In addition, at least two lateral communication grooves 3a, 3b of the pneumatic tire 1 communicate with one V-shaped crossing groove 2a (2b) (see FIG. 2). As a result, the communicating portions between the V-shaped crossing groove 2a (2b) and the lateral communication grooves 3a, 3b are increased, and the water drainage performance is further advantageously enhanced.

In addition, in the pneumatic tire 1, the V-shaped peak portion 21 of each of the V-shaped crossing grooves 2 is disposed a predetermined interval distanced from the tire equatorial plane CL (see FIG. 2). As a result, the tire water drainage performance of the tire when the vehicle is turning is advantageously enhanced.

In addition, in the pneumatic tire 1, the V-shaped peak portion 21 of each of the V-shaped crossing grooves 2 is disposed in the tread portion center region (see FIG. 2). As a result, water drainage passages from the center region to the tread edge portions are ensured, and the water drainage performance of the tire is advantageously enhanced.

In addition, in the pneumatic tire 1, the V-shaped crossing grooves 2 have a shape of which the angle of inclination with respect to the tire circumferential direction increases as the V-shaped crossing grooves 2 each extend from the V-shaped peak portion 21 toward the tread edge portions (see FIG. 2). As a result, the water drainage performance of the tire is advantageously enhanced.

In addition, the V-shaped crossing grooves 2 of the pneumatic tire 1 each include the bent portions 22, 22 disposed between the V-shaped peak portion 21 and the left and right tread edge portions. The left and right bent portions 22, 22 are disposed a predetermined interval distanced from each other in the tire circumferential direction (see FIG. 2). As a result, the edge components formed by the bent portions 22, 22 are distributed in the tire circumferential direction, and the breaking on snow performance of the tire is advantageously enhanced.

In addition, adjacent V-shaped crossing grooves 2a, 2b of the pneumatic tire 1 are disposed overlapping in the tire circumferential direction (see FIG. 2). As a result, the V-shaped crossing grooves 2a, 2b are disposed close to each other, and the wet performance and breaking on snow performance of the tire is advantageously enhanced.

In addition, in the pneumatic tire 1, the angle of inclination α with respect to the tire equatorial plane CL of the lateral communication grooves 3 at the portion closest to the tire equatorial plane CL is in the range of 0 degrees≤α≤30 degrees (see FIG. 3). As a result, the water drainage performance of the tire is advantageously enhanced.

In addition, the crossing angle β (β1, β2) between the lateral communication groove 3 and the V-shaped crossing grooves 2 is in the range of 20 degrees≤β1≤60 degrees (see FIG. 3). As a result, the balance of rigidity in the blocks 52 defined by the lateral communication grooves 3 and the V-shaped crossing grooves 2 is appropriate, and wet steering stability performance is advantageously enhanced.

In addition, in the pneumatic tire 1, the lateral communication grooves 3 and the V-shaped crossing grooves 2 communicate in the tread portion center region (see FIG. 2). As a result, the water drainage performance of the tire is advantageously enhanced.

In addition, the lateral communication grooves 3 of the pneumatic tire 1 each communicate with the V-shaped peak portion 21 of at least one V-shaped crossing groove 2 (see FIG. 2). As a result, a plurality of water drainage passages are ensured, and the water drainage performance of the tire is advantageously enhanced.

In addition, the pneumatic tire 1 is provided with the blocks 51 to 53 defined by the V-shaped crossing grooves 2 and the lateral communication grooves 3 (see FIG. 3). The blocks 51 to 53 include an auxiliary groove (the inclined auxiliary groove 6 of FIG. 3 for example) that opens to at least one of: the V-shaped crossing groove 2 and the lateral communication groove 3. As a result, the wet performance and the breaking on snow performance of the tire is advantageously enhanced.

In addition, in the pneumatic tire 1, the auxiliary grooves (the inclined auxiliary grooves 6 in FIG. 3 for example) have an inclination direction with respect to the tire circumferential direction opposite to that of the V-shaped crossing groove 2 or the lateral communication groove 3 that the auxiliary groove opens to (see FIG. 3). As a result, the wet performance and the breaking on snow performance of the tire is advantageously enhanced.

The blocks 51 to 53 of the pneumatic tire 1 include a plurality of sipes 7 (see FIG. 3). As a result, the breaking on snow performance of the tire is advantageously enhanced.

Rotational Direction Designation

The pneumatic tire 1 is provided with a mark or a ridged and grooved portion that displays the designation of the projecting side of the V-shape of the V-shaped crossing grooves 2 as the tire rotational direction (see FIG. 2). "Tire rotational direction" refers to the rotational direction frequently used when the tire is in use, for example the rotational direction when the vehicle travels forward. The designation of the rotational direction is displayed on the sidewall portion of the tire for example. By mounting the pneumatic tire 1 on a vehicle in accordance to the tire rotational direction designation described above, the wet performance and the breaking on snow performance of the tire is advantageously enhanced.

EXAMPLES

Figure 5:
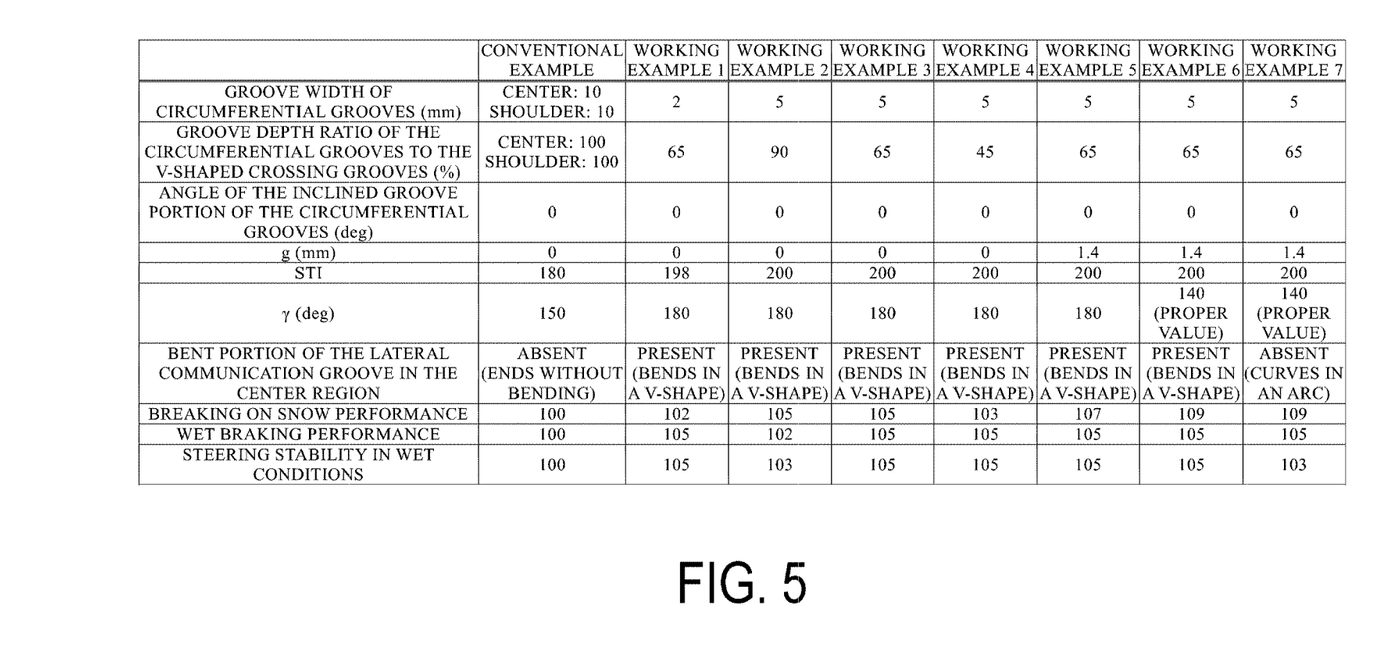
FIG. 5 is a table showing results of performance testing of the pneumatic tire according to the embodiment of the technology.
Figure 6:
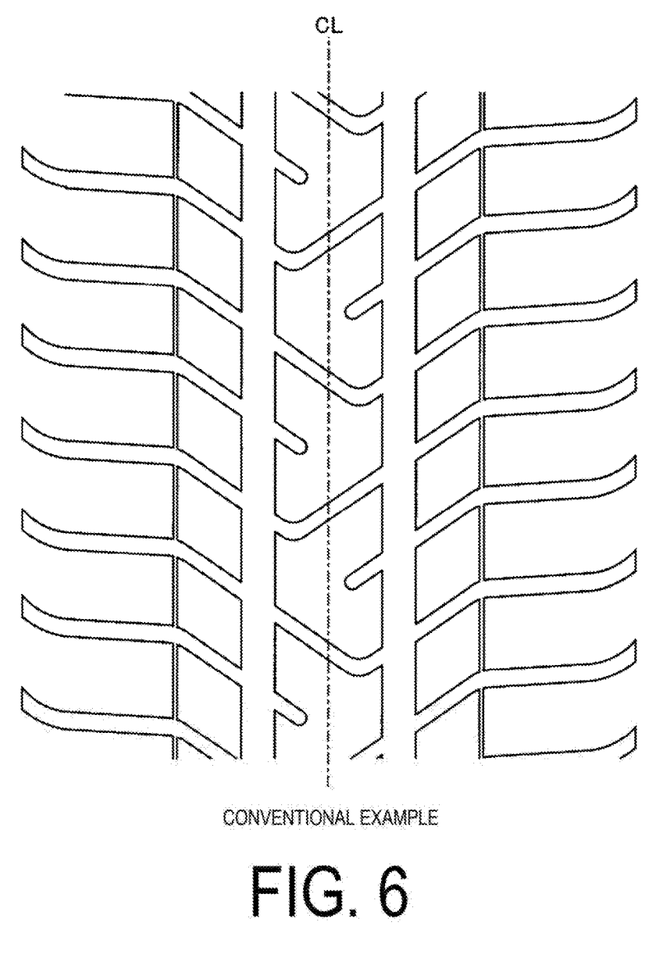
FIG. 6 is a plan view illustrating a tread portion of a pneumatic tire of a Conventional Example.

FIG. 5 is a table showing results of performance testing of pneumatic tires according to the embodiment of the present technology. FIG. 6 is a plan view illustrating a tread portion of a pneumatic tire of a Conventional Example.

In the performance tests, a plurality of mutually differing pneumatic tires were evaluated for (1) breaking on snow performance, (2) wet braking performance, and (3) steering stability in wet conditions. In the performance tests, pneumatic tires with a tire size of 195/65R15 were assembled on a rim having a rim size of 15×6J, and an air pressure of 220 kPa and the maximum load defined by JATMA were applied to these pneumatic tires. Also, the pneumatic tires were mounted to a front-engine front-drive (FF) test vehicle of 1500 cc displacement.

(1) Evaluation of breaking on snow performance: The test vehicle was driven on a snowy road surface of a snowy road test site, and the braking distance at a traveling speed of 40 km/h was measured. Then, on the basis of the measurement results, index evaluation was performed taking the results of the Conventional Example as a reference (100). With this evaluation, larger numerical values are preferable.

(2) Evaluation of wet braking performance: The test vehicle was driven on an asphalt road surface covered with 1 mm of water, and the braking distance at a traveling speed of 100 km/h was measured. Then, on the basis of the measurement results, index evaluation was performed taking the results of the Conventional Example as a reference (100). With this evaluation, larger numerical values are preferable.

(3) Evaluation of steering stability in wet conditions: The test vehicle was driven on an asphalt road surface covered with 1 mm of water at 100 km/h, and the test driver performed a sensory evaluation regarding the steering stability. Index evaluation was performed taking the results of the Conventional Example as a reference (100). Larger numerical values are preferable.

The pneumatic tire of the Conventional Example is provided with the tread pattern illustrated in FIG. 6, in which two circumferential main grooves are disposed in the tread portion center region, and two circumferential narrow grooves are disposed in the tread portion shoulder region. In addition, the pneumatic tire of the Conventional Example includes a plurality of V-shaped crossing grooves and lug grooves that communicate with the circumferential main grooves but not with the V-shaped crossing grooves.

The pneumatic tires 1 of the Working Examples 1 to 7 are based on the tread pattern illustrated in FIGS. 2 and 3 and have partially modified configurations. In addition, the V-shaped crossing grooves 2 and the lateral communication grooves 3 have a groove width of 5.0 mm and a groove depth of 8.5 mm. The bend angle of the peak portion 21 of the V-shaped crossing groove 2 is set to 100 degrees. The angle of inclination α of the V-shaped crossing grooves 2 is 8 degrees, and the crossing angles β1, β2 between the lateral communication grooves 3 and the V-shaped crossing grooves 2 is 40 degrees. In addition, the number of long blocks 51 disposed at the tire equatorial plane CL is from 44 to 54, and the number of shoulder blocks 53 disposed at the tire ground contact edge T is from 66 to 81.

As is clear from the test results, compared with the pneumatic tires of the Conventional Example, the pneumatic tires 1 of the Working Examples 1 to 7 have enhanced breaking on snow performance, wet braking performance, and steering stability in wet conditions.

The invention claimed is:

1. A pneumatic tire comprising:
    V-shaped crossing grooves having a V-shape projecting in a tire circumferential direction that cross a tread portion in a tire width direction and open to left and right tread edge portions, the V-shaped crossing grooves being arranged at predetermined intervals in the tire circumferential direction with an orientation of the V-shape aligned;
    lateral communication grooves disposed between a pair of the V-shaped crossing grooves adjacent in the tire circumferential direction and extending from one of the tread edge portions toward a tire equatorial plane in a tread portion shoulder region, each of the lateral communication grooves directly communicating with at least one V-shaped crossing groove located to a projecting side of the V-shape of the pair of V-shaped crossing grooves and not directly communicating with the other V-shaped crossing groove of the pair in a tread portion center region, wherein the V-shaped crossing grooves or the lateral communication grooves comprise a bent portion located at the circumferential groove, the bent portion bending toward the projecting side of the V-shape of the V-shaped crossing grooves while extending toward the tire equatorial plane;
    circumferential grooves disposed in the tread portion shoulder region extending in the tire circumferential direction, the circumferential grooves communicating with the V-shaped crossing grooves and the lateral communication grooves; and
    long blocks defined by the V-shaped crossing grooves, the lateral communication grooves, and the circumferential grooves, each of the long blocks extending continuously from one of the circumferential grooves to a position beyond the tire equatorial plane; wherein
    a bend angle γ of the bent portion of the V-shaped crossing grooves or the lateral communication grooves at a communicating portion with the circumferential grooves is in a range of 120 degrees≤γ≤160 degrees.

2. The pneumatic tire according to claim 1, wherein a circumferential main groove extending continuously in the tire circumferential direction is not disposed in a region to an inner side of the circumferential grooves in the tire width direction.

3. The pneumatic tire according to claim 1, wherein a number of blocks disposed at the tire equatorial plane is less than a number of blocks disposed at a tire ground contact edge.

4. The pneumatic tire according to claim 1, wherein the V-shaped crossing grooves comprise a bent portion located at each of the circumferential grooves, the bent portions bending toward the projecting side of the V-shape of the V-shaped crossing grooves while extending toward the tire equatorial plane.

5. The pneumatic tire according to claim 1, wherein the lateral communication grooves comprise a bent portion located in the tread portion center region, the bent portion bending toward the projecting side of the V-shape of the V-shaped crossing grooves while extending toward the tire equatorial plane.

6. The pneumatic tire according to claim 1, wherein a groove width of the circumferential grooves is not less than 3 mm.

7. The pneumatic tire according to claim 1, wherein a groove depth of the circumferential grooves is in a range of not less than 50% and not more than 80% of a groove depth of the V-shaped crossing grooves.

8. The pneumatic tire according to claim 1, wherein the circumferential grooves are formed by a plurality of inclined groove portions connected in the tire circumferential direction, and an angle of inclination of the inclined groove portions with respect to the tire equatorial plane is in a range of ±15 degrees.

9. The pneumatic tire according to claim 1, wherein a tread pattern is formed by a repeating circumferential array of:
    a first V-shaped crossing groove, which is one of the V-shaped crossing grooves;
    a first lateral communication groove, which is one of the lateral communication grooves, disposed to the projecting side of the V-shape of the first V-shaped crossing groove in a region to one side of the tire equatorial plane;
    a second V-shaped crossing groove, which is one of the V-shaped crossing grooves, disposed sandwiching the first lateral communication groove with the first V-shaped crossing groove; and
    a second lateral communication groove, which is one of the lateral communication grooves, disposed to the projecting side of the V-shape of the second V-shaped crossing groove in a region to the other side of the tire equatorial plane.

10. The pneumatic tire according to claim 9, further comprising:
    a second long block defined by the second V-shaped crossing groove and the second lateral communication groove and disposed in the region to the other side of the tire equatorial plane extending continuously from the tread portion shoulder region to a position beyond the tire equatorial plane, wherein
    the first long block and the second long block are arranged alternating in the tire circumferential direction at the tire equatorial plane.

11. The pneumatic tire according to claim 1, wherein a snow traction index STI with respect to the tire width direction throughout the entire circumference of the tire is in a range of 160≤STI≤240.

12. The pneumatic tire according to claim 1, wherein a JIS-A hardness at 20° C. of a cap tread rubber is in a range of not less than 50 and not more than 70.

13. The pneumatic tire according to claim 1, wherein at least two of the lateral communication grooves communicate with one of the V-shaped crossing grooves.

14. The pneumatic tire according to claim 1, wherein a peak portion of the V-shape of the V-shaped crossing grooves is disposed a predetermined interval distanced from the tire equatorial plane.

15. The pneumatic tire according to claim 1, wherein the peak portion of the V-shape of the V-shaped crossing grooves is disposed in the tread portion center region.

16. The pneumatic tire according to claim 1, wherein the V-shaped crossing grooves have a shape of which an angle of inclination with respect to the tire circumferential direction increases as the V-shaped crossing grooves extend from the peak portion of the V-shape toward the tread edge portions.

17. The pneumatic tire according to claim 1, wherein the V-shaped crossing grooves comprise bent portions disposed between the peak portion of the V-shape and the left and right tread edge portions, and the left and right bent portions are disposed a predetermined interval distanced from each other in the tire circumferential direction.

18. The pneumatic tire according to claim 1, wherein the adjacent V-shaped crossing grooves are disposed overlapping in the tire circumferential direction.

19. The pneumatic tire according to claim 1, wherein an angle of inclination α with respect to the tire equatorial plane of the lateral communication grooves at the portion closest to the tire equatorial plane is in a range of 0 degrees≤α≤30 degrees.

20. The pneumatic tire according to claim 1, wherein a crossing angle β between the lateral communication grooves and the V-shaped crossing grooves is in a range of 20 degrees≤β≤60 degrees.

21. The pneumatic tire according to claim 1, wherein the lateral communication grooves and the V-shaped crossing grooves communicate in the tread portion center region.

22. The pneumatic tire according to claim 1, wherein each of the lateral communication grooves communicates with the peak portion of the V-shape of at least one of the V-shaped crossing grooves.

23. The pneumatic tire according to claim 1, further comprising blocks defined by the V-shaped crossing grooves and the lateral communication grooves, wherein each of the blocks comprises an auxiliary groove that opens to at least one of: the V-shaped crossing groove and the lateral communication groove.

24. The pneumatic tire according to claim 1, wherein the auxiliary groove has an inclination direction with respect to the tire circumferential direction opposite to that of the V-shaped crossing groove or the lateral communication groove that the auxiliary groove opens to.

25. The pneumatic tire according to claim 1, further comprising blocks defined by the V-shaped crossing grooves and the lateral communication grooves, wherein each of the blocks comprises a plurality of sipes.

26. The pneumatic tire according to claim 1, further comprising a mark or a ridged and grooved portion that displays a designation of the projecting side of the V-shape of the V-shaped crossing grooves as a tire rotational direction.

27. A pneumatic tire comprising:
V-shaped crossing grooves having a V-shape projecting in a tire circumferential direction that cross a tread portion in a tire width direction and open to left and right tread edge portions, the V-shaped crossing grooves being arranged at predetermined intervals in the tire circumferential direction with an orientation of the V-shape aligned, wherein the V-shaped crossing grooves comprise bent portions disposed between the peak portion of the V-shape and the left and right tread edge portions, and the left and right bent portions are disposed a predetermined interval distanced from each other in the tire circumferential direction;

lateral communication grooves disposed between a pair of the V-shaped crossing grooves adjacent in the tire circumferential direction and extending from one of the tread edge portions toward a tire equatorial plane in a tread portion shoulder region, each of the lateral communication grooves directly communicating with the V-shaped crossing groove located to a projecting side of the V-shape of the pair of V-shaped crossing grooves and not directly communicating with the other V-shaped crossing groove of the pair in a tread portion center region;

circumferential grooves disposed in the tread portion shoulder region extending in the tire circumferential direction, the circumferential grooves communicating with the V-shaped crossing grooves and the lateral communication grooves; and long blocks defined by the V-shaped crossing grooves, the lateral communication grooves, and the circumferential grooves, each of the long blocks extending continuously from one of the circumferential grooves to a position beyond the tire equatorial plane a bend angle γ of the bent portion of the V-shaped crossing grooves or the lateral communication grooves at a communicating portion with the circumferential grooves is in a range of 120 degrees≤γ≤160 degrees.

28. The pneumatic tire according to claim 1, wherein the lateral communication grooves have a groove width of not less than 3.0 mm, the lateral communication grooves are bent in an L-shape in the tire circumferential direction and communicate with the V-shaped crossing grooves in the tread portion center region.

29. The pneumatic tire according to claim 27, wherein the lateral communication grooves have a groove width of not less than 3.0 mm, the lateral communication grooves are bent in an L-shape in the tire circumferential direction and communicate with the V-shaped crossing grooves in the tread portion center region.

30. The pneumatic tire according to claim 1, wherein a groove width of the circumferential grooves is not less than 3 mm, and no other circumferential groove having a straight shape and extending continuously in the tire circumferential direction is disposed between the circumferential groove and the tire equatorial plane.

31. The pneumatic tire according to claim 27, wherein a groove width of the circumferential grooves is not less than 3 mm, and no other circumferential groove having a straight shape and extending continuously in the tire circumferential direction is disposed between the circumferential groove and the tire equatorial plane.

32. The pneumatic tire according to claim 1, wherein a groove width of the V-shaped crossing grooves widens from the tire equatorial plane toward a tire ground contact edge.

33. The pneumatic tire according to claim 27, wherein a groove width of the V-shaped crossing grooves widens from the tire equatorial plane toward a tire ground contact edge.

* * * * *